US008024849B2

(12) United States Patent
Geyer

(10) Patent No.: US 8,024,849 B2
(45) Date of Patent: Sep. 27, 2011

(54) FIRE EXTINGUISHER

(76) Inventor: James E. Geyer, Fort Wayne, IN (US)

( * ) Notice: Subject to any disclaimer, the term of this patent is extended or adjusted under 35 U.S.C. 154(b) by 389 days.

(21) Appl. No.: 12/055,380

(22) Filed: Mar. 26, 2008

(65) Prior Publication Data

US 2008/0222875 A1 Sep. 18, 2008

Related U.S. Application Data

(63) Continuation of application No. 11/380,258, filed on Apr. 26, 2006.

(60) Provisional application No. 60/675,329, filed on Apr. 27, 2005.

(51) Int. Cl.
*B23P 11/00* (2006.01)
*A62C 37/14* (2006.01)

(52) U.S. Cl. ................ 29/505; 29/447; 29/508; 29/516; 29/520; 169/58

(58) Field of Classification Search .................... 169/58, 169/54, 56, 26, 27, 28, 29, 19, 20, 21, 22, 169/73, 81, 83, DIG. 3; 29/505, 506, 508, 29/516, 517, 520, 447; 285/381.1, 381.2, 285/381.4, 382, 382.7; 403/279, 273, 281, 403/282, 341
See application file for complete search history.

(56) References Cited

U.S. PATENT DOCUMENTS 214,557 A 4/1879 Furguson
338,242 A 3/1886 Ballou
1,182,380 A 5/1916 Johnson
1,588,234 A 6/1926 Kauch
2,588,587 A 3/1952 Sweetland et al.
2,764,245 A 9/1956 Gutterman
3,138,936 A 6/1964 Cohen
3,827,502 A 8/1974 Lockwood
3,833,063 A * 9/1974 Williams ........................ 169/28
4,089,804 A 5/1978 Falk
4,109,727 A 8/1978 Job
4,234,432 A 11/1980 Tarpley, Jr.
4,469,357 A * 9/1984 Martin ....................... 285/381.3
4,544,187 A * 10/1985 Smith ........................... 285/256
4,548,430 A * 10/1985 Haubert et al. ............... 285/256

(Continued)

FOREIGN PATENT DOCUMENTS

WO 0012180 3/2000

OTHER PUBLICATIONS

Fire Foe, "What is Fire Foe?", http://www.powsus.com/firefoe.htm, accesed on Mar. 17, 2005.

(Continued)

*Primary Examiner* — Essama Omgba
(74) *Attorney, Agent, or Firm* — Baker & Daniels LLP

(57) ABSTRACT

The fire extinguisher of the present invention includes a container housing a fire inhibiting material which may automatically discharge its fire inhibiting contents in response to a fire. In one exemplary embodiment, the fire inhibiting material is pressurized within the container and the container is structured and arranged to discharge its fire inhibiting contents in a predetermined direction. Also, a method is provided for constructing a container for holding fire inhibiting contents under pressure and a method and apparatus for effectively and efficiently filling and pressurizing the container with fire inhibiting material, forming a container structured and arranged to expel the fire inhibiting material contained therein in a predefined direction in response to a fire.

12 Claims, 11 Drawing Sheets

U.S. PATENT DOCUMENTS

| | | | | | |
|---|---|---|---|---|---|
| 4,832,382 | A * | 5/1989 | Kapgan | 285/369 |
| 4,854,389 | A | 8/1989 | Warren et al. | |
| 4,872,713 | A * | 10/1989 | Kapgan | 285/381.3 |
| 4,938,293 | A | 7/1990 | Warren et al. | |
| 5,055,208 | A | 10/1991 | Stewart et al. | |
| 5,088,560 | A | 2/1992 | Fawal | |
| 5,096,234 | A * | 3/1992 | Oetiker | 285/256 |
| 5,115,867 | A | 5/1992 | Tyler | |
| 5,127,157 | A * | 7/1992 | Oetiker | 29/890.144 |
| 5,466,386 | A | 11/1995 | Stewart et al. | |
| 5,678,638 | A | 10/1997 | Baker | |
| 5,833,874 | A | 11/1998 | Stewart et al. | |
| 5,864,938 | A * | 2/1999 | Gansel et al. | 29/506 |
| 5,909,776 | A | 6/1999 | Stewart et al. | |
| 6,024,889 | A | 2/2000 | Holland et al. | |
| 6,056,063 | A | 5/2000 | Hung et al. | |
| 6,161,624 | A | 12/2000 | Bennett | |
| 6,345,431 | B1 * | 2/2002 | Greig | 29/506 |
| 6,371,213 | B1 | 4/2002 | Smith et al. | |
| 6,612,243 | B1 * | 9/2003 | Italiane et al. | 102/367 |
| 6,736,989 | B2 | 5/2004 | Stewart et al. | |

OTHER PUBLICATIONS

Nautical Fire Suppression Ltd., “Pre-Engineered Fire Foe Systems”, http://www.interlinksolutions.com/firefoe.htm, accessed on Mar. 17, 2005.

Martin Flory Group, Media flyer, Sea-Fire, “Automatic Fire Suppression System Utilizes Envirogel”.

Powsus, Inc., “Envirogel”, http://powsus.com/enviro.htm, accessed on Mar. 17, 2005.

Powsus, Inc., “Fire Tubes”, http://powsus.com/firetube.htm, accessed on Mar. 17, 2005.

“Fire Foe Automatic Fire Extinguisher with Envirogel”, Owners Manual and Installation Instructions, Rev. 04/205.

“Fire Foe by Sea-Fire Automatic Fire Extinguisher with Envirogel”, Owners Manual and Installation Instructions, Rev. Apr. 2005.

Office Action mailed Apr. 3, 2007 in related U.S. Appl. No. 11/380,258.

Amendment in response to Office Action filed Jul. 3, 2007 in related U.S. Appl. No. 11/380,258.

Final Office Action mailed Sep. 24, 2007 in related U.S. Appl. No. 11/380,258.

Amendment in response to Office Action filed Jan. 24, 2008 in related U.S. Appl. No. 11/380,258.

Office Action mailed Feb. 7, 2008 in related U.S. Appl. No. 11/380,258.

Amendment in response to Office Action filed Jul. 7, 2008 in related U.S. Appl. No. 11/380,258.

Final Office Action mailed Oct. 17, 2008 in related U.S. Appl. No. 11/380,258.

Amendment in response to Office Action filed Jan. 19, 2009 in related U.S. Appl. No. 11/380,258.

Office Action mailed Jan. 30, 2009 in related U.S. Appl. No. 11/380,258.

Amendment in response to Office Action filed Jun. 30, 2009 in related U.S. Appl. No. 11/380,258.

Final Office Action mailed Nov. 10, 2009 in related U.S. Appl. No. 11/380,258.

Amendment in response to Office Action filed Feb. 10, 2010 in related U.S. Appl. No. 11/380,258.

Office Action mailed Mar. 24, 2010 in related U.S. Appl. No. 11/380,258.

Amendment in response to Office Action filed Sep. 23, 2010 in U.S. Appl. No. 11/380,258.

Final Office Action mailed Dec. 17, 2010 in related U.S. Appl. No. 11/380,258.

Amendment in response to Final Office Action filed Mar. 17, 2011 in related U.S. Appl. No. 11/380,258.

* cited by examiner 20
22
24
26
30
32
38
39
42
86
3
5

FIRE EXTINGUISHER

CROSS-REFERENCE TO RELATED APPLICATIONS

This is a Continuation of U.S. patent application Ser. No. 11/380,258 filed Apr. 26, 2006, which claims the benefit under 35 U.S.C. §119(e) of U.S. Provisional Application Ser. No. 60/675,329 entitled FIRE EXTINGUISHER filed on Apr. 27, 2005, the disclosures of which are expressly incorporated herein by reference.

BACKGROUND

1. Field of the Invention

The present invention relates to an apparatus for extinguishing fires as well as to methods and materials used to construct the fire extinguishing apparatus.

2. Description of the Related Art

Fire extinguishers generally operate to extinguish a fire by ejecting a fire inhibiting substance onto the fire. Fire extinguishers that automatically discharge a fire inhibiting substance in response to detection of a fire are useful in many circumstances. For example, should a fire break out in an area that is not readily accessible, a fire extinguisher that functions to discharge its fire inhibiting substance on the fire automatically in response to detection of the fire is very useful. One such automatic fire extinguisher is described in U.S. Pat. No. 5,909,776, the entire disclosure of which is hereby explicitly incorporated by reference herein.

In the case of an automatic fire extinguisher, it is most useful to provide an extinguisher positioned and constructed to directly apply its fire inhibiting contents to the fire.

SUMMARY

The fire extinguisher of the present invention includes a container housing a fire inhibiting material which may automatically discharge its fire inhibiting contents in response to a fire. In one exemplary embodiment, the fire inhibiting material is pressurized within the container and the container is structured and arranged to discharge its fire inhibiting contents in a predetermined direction. Also, a method is provided for constructing a container for holding fire inhibiting contents under pressure and a method and apparatus for effectively and efficiently filling and pressurizing the container with fire inhibiting material, forming a container structured and arranged to expel the fire inhibiting material contained therein in a predefined direction in response to a fire.

Advantageously, the present fire extinguisher can automatically discharge when the temperature around the fire extinguisher rises above a predetermined point, allowing for the fire extinguisher to quench a fire without the need for human intervention. Additionally, the fire extinguisher may be constructed to discharge its contents in a predetermined direction, protecting the most vital areas of a given structure, such as the tires or engine of a motor vehicle.

In one form thereof, the present invention provides a fire extinguisher, including: a container including a wall having a first thickness and defining an interior cavity, and a discharge window formed as a substantial area of the wall, the discharge window having a second thickness which is less than the first thickness; and a quantity of fire inhibiting substance contained within the interior cavity, the fire inhibiting substance expandable at an elevated temperature to discharge through the discharge window along a focused direction substantially defined by the discharge window.

In another form thereof, the present invention provides a fire extinguisher, including: a container including a wall defining an interior cavity; a first fitting having an exterior surface including a groove, the first fitting received at least partially within an open first end of the container with at least a portion of the wall pressed into the groove; and a quantity of fire inhibiting substance contained within the tube, the fire inhibiting substance expandable at an elevated temperature to discharge from the container.

In another form thereof, the present invention provides a method of sealing a container, including the steps of: providing a container having a wall defining an interior cavity, and a fitting having an exterior surface including at least one groove; positioning the fitting within an open end of the container at least partially within the interior cavity; deforming the wall to press at least a portion of the wall into the groove.

BRIEF DESCRIPTION OF THE DRAWINGS

The above mentioned and other features of this invention, and the manner of attaining them, will become more apparent and the invention itself will be better understood by reference to the following description of an exemplary embodiment of the invention taken in conjunction with the accompanying drawings, wherein.

Figures 1, 2, 3, 4, 5:
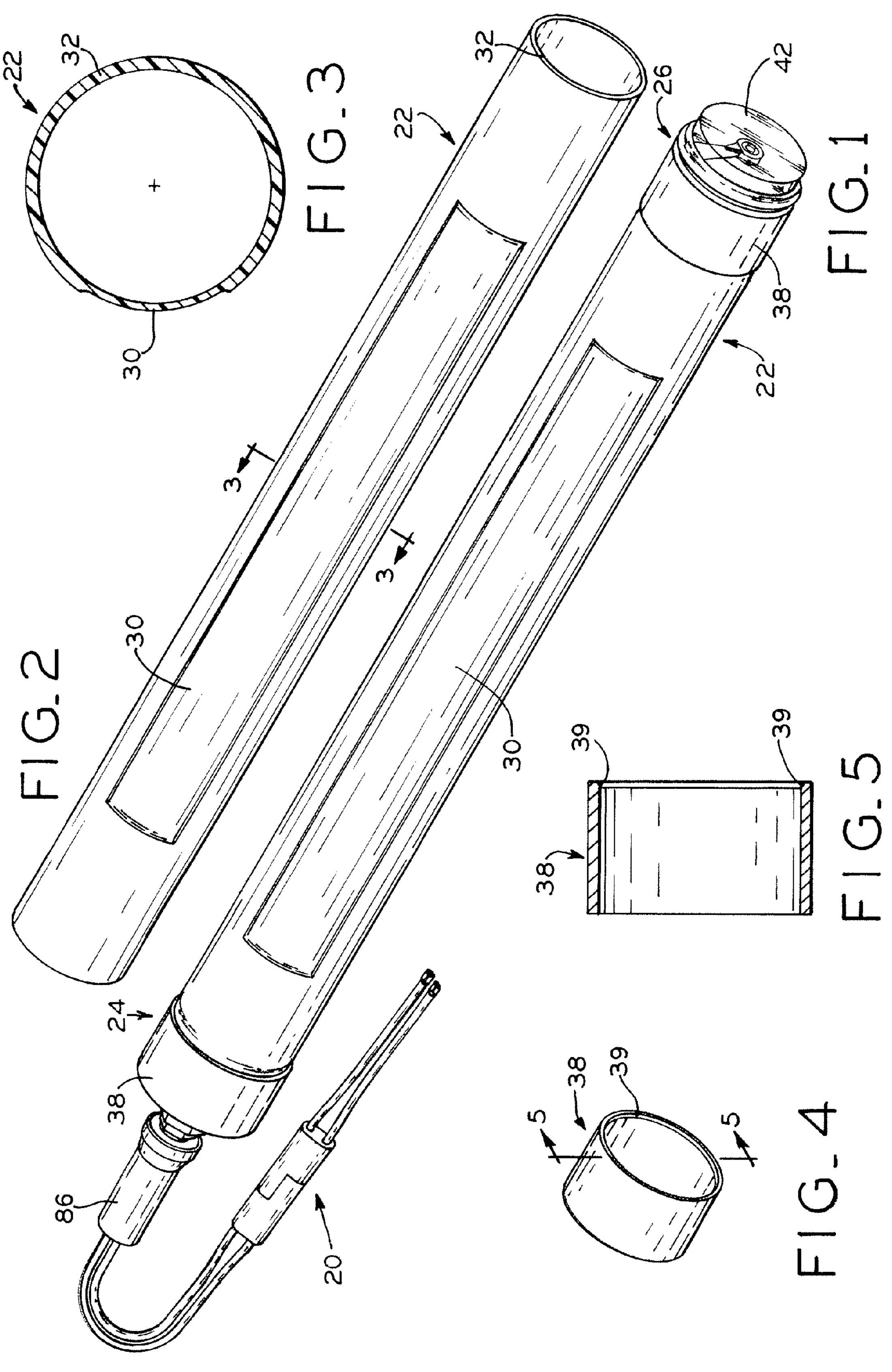
FIG. 1 is a perspective view of an exemplary fire extinguisher made in accordance with the present invention.
FIG. 2 is a perspective view of a tube which forms a part of the fire extinguisher illustrated in FIG. 1.
FIG. 3 is a sectional view of the tube illustrated in FIG. 2 taken along line 3-3 of FIG. 2.
FIG. 4 is a perspective view of a collar used to secure a fitting to an end of the tube forming a part of the fire extinguisher illustrated in FIG. 1.
FIG. 5 is a sectional view of the collar illustrated in FIG. 4 taken along line 5-5 of FIG. 4.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention and such exemplifications are not to be construed as limiting the scope of the invention in any manner.

DETAILED DESCRIPTION

The embodiments disclosed below are not intended to be exhaustive or limit the invention to the precise forms disclosed in the following detailed description. Rather, the embodiments are chosen and described so that others skilled in the art may utilize their teachings.

Fire extinguisher 20, as depicted in FIG. 1 and described in detail below, forms an enclosure which may contain a fire inhibiting substance 28, shown in FIG. 6. As the temperature around fire extinguisher 20 increases, fire inhibiting substance 28 expands, increasing the pressure within fire extinguisher 20. When the temperature around fire extinguisher 20 reaches a set point, the pressure inside fire extinguisher 20 is high enough to cause tube 22 to burst and expel the fire inhibiting substance 28 through discharge window 30, as described in detail below.

Referring to FIG. 1, fire extinguisher 20 includes tube 22 having opposite ends 24, 26. Tube 22 cooperates with opposite ends 24, 26 to form an enclosure containing a fire inhibiting substance 28, shown in FIG. 6. Fire inhibiting substance 28 is, in one exemplary embodiment, a gelled halocarbon and dry chemical suspension marketed under the name ENVIROGEL by Powsus, Inc., 1178 Wisteria Drive, Malvern, Pa. 19355, ENVIROGEL is a trademark of Powsus, Inc. 1178 Wisteria Drive, Malvern, Pa. 19355. One exemplary composition of ENVIROGEL is made of up of 40% by weight gelled ammonium polyphosphate and 60% by weight HFC-236fa. Other exemplary fire inhibiting substances are disclosed in U.S. Pat. Nos. 5,833,874; 5,466,386; 5,909,776; and 6,736,989, each assigned to Powsus, Inc., the entire disclosures of which are hereby explicitly incorporated by reference herein.

As illustrated in FIGS. 1-3 and 6, tube 22 includes discharge window 30. Referring to FIG. 3, tube wall 32 of tube 22 includes an area of decreased thickness forming discharge window 30, which defines an outer perimeter and covers a substantial area. In one embodiment, the outer perimeter has a substantially rectangular shape. Additionally, discharge window 30 defines a focused direction for discharge of fire inhibiting substance 28. Owing to the decreased wall thickness of discharge window 30, fire inhibiting substance 28 will be most readily released from fire extinguisher 20 through discharge window 30, as further described hereinbelow. In use, discharge window 30 of fire extinguisher 20 provides a focused direction for the release of fire inhibiting substance 28, shown in FIG. 6, therefrom.

As described in detail below, fire inhibiting substance 28 is placed under pressure in fire extinguisher 20. In one exemplary embodiment, the walls of tube 22 are resistant to the pressure contained within tube 22 at temperatures below 120° F. In one exemplary embodiment, the pressure contained within tube 22 is approximately 100 psi. When tube 22 is heated above 120° F., fire inhibiting substance 28 expands placing additional internal pressure on the walls of tube 22 causing tube 22 to burst and expel fire inhibiting substance 28 contained therein. Because discharge window 30 has a smaller wall thickness than the remainder of tube 22, tube 22 is more likely to burst at discharge window 30 and fire inhibiting substance 28 is most readily discharged from tube 22 through discharge window 30 along a focused direction as defined above.

Fire Extinguisher Structure

Figure 6:
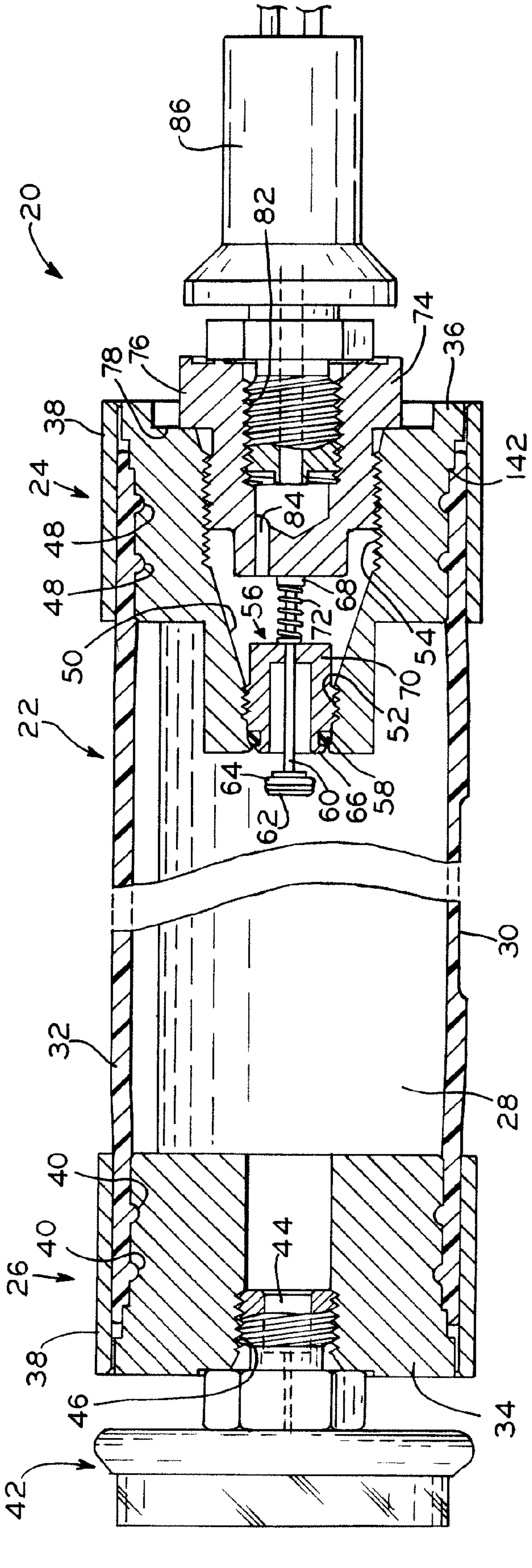
FIG. 6 is a longitudinal fragmentary sectional view of the fire extinguisher illustrated in FIG. 1.

Referring to FIGS. 1-11, the structure of fire extinguisher 20 will now be described in detail. Referring to FIG. 6, fire extinguisher 20 includes tube 22 and opposite ends 24, 26. In one exemplary embodiment, tube 22 is formed of nylon. In a further embodiment, tube 22 is formed of ASCEND™ 67B high viscosity nylon, available, e.g., from Solutia Inc., 575 Maryvill Centre Drive, St. Louis, Mo. 63166. In another embodiment, tube 22 is formed of a nylon resin, such as DuPont Zytel® nylon resin, available from E.I duPont de Nemours & Co., Wilmington, Del. 19880, and, in particular, Zytel® 45HSB NC010 nylon resin. Zytel® is a registered trademark of E.I duPont de Nemours & Co., Wilmington, Del. 19880. Opposite ends 24, 26 each include a fitting 36, 34, respectively, positioned within tube 22 as well as collars 38 surrounding at least portions of tube 22 and fittings 34, 36. Collars 38 crimp the ends of tube 22 to fittings 34, 36 to create a sealed enclosure for fire inhibiting substance 28. In one exemplary embodiment, fire inhibiting substance 28 occupies approximately 95% of the enclosure created by tube 22, fittings 34, 36 and collars 38. The remaining space of the enclosure is, in one exemplary embodiment, filled with an inert gas such as nitrogen. As further described hereinbelow, the materials contained within fire extinguisher 20 may be pressurized to about 100 psi.

Figure 7:
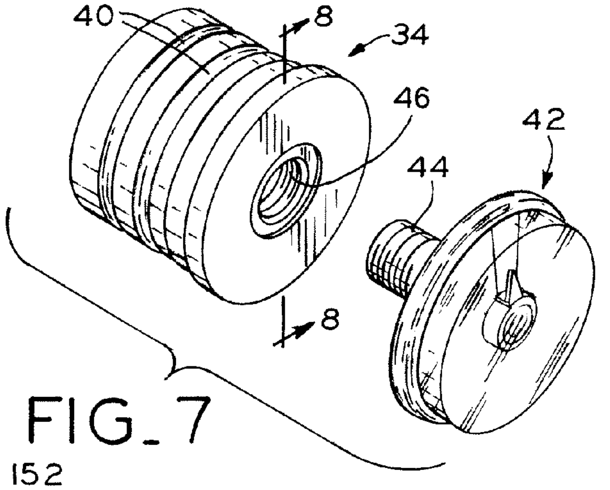
FIG. 7 is an exploded view of a fitting and associated pressure gauge for indicating the internal pressure of the fire extinguisher of FIG. 6.
Figure 8:
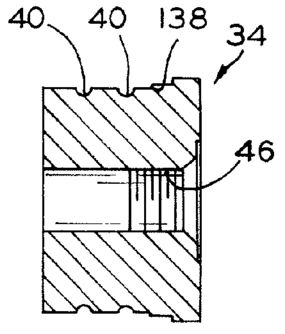
FIG. 8 is a sectional view of the fitting illustrated in FIG. 7.
Figure 9:
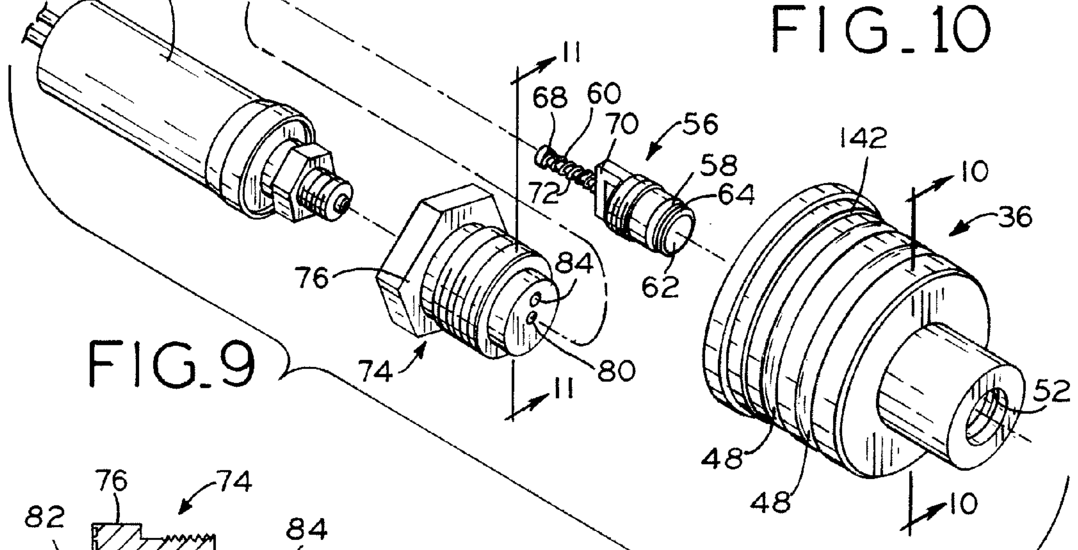
FIG. 9 is an exploded view of a fitting and associated valve and pressure switch, also illustrating a filling apparatus of the present invention useful to position fire inhibiting material within the fire extinguisher of FIG. 1 and to pressurize the same.
Figure 10:
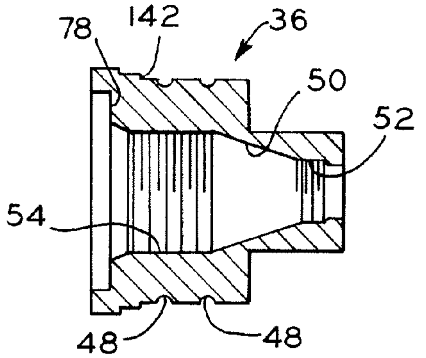
FIG. 10 is a sectional view of the fitting illustrated in FIG. 9.

Referring to FIGS. 6-8, fitting 34 includes annular grooves 40. Referring to FIGS. 6, 9 and 10, fitting 36 similarly includes annular grooves 48. During the process of constructing fire extinguisher 20, further described hereinbelow, the ends of tube 22 are heated until the material forming tube wall 32 is flowable. The heated tube ends are thereafter positioned over fittings 34, 36. Collars 38 are thereafter positioned over the ends of tube 22 and the associated fittings 34, 36, capturing wall 32 between the exterior of fittings 34, 36 and collars 38, and causing the flowable material of tube wall 32 to occupy annular grooves 40, 48. The process for constructing fire extinguisher 20, including opposite ends 24, 26 is described in greater detail hereinbelow.

As illustrated in FIGS. 1 and 6, pressure gauge 42 is connected to fitting 34 and is in fluid communication with the interior of fire extinguisher 20. In the embodiment illustrated, pressure gauge 42 includes threaded boss 44 sized to threadingly engage threaded internal bore 46 of fitting 34. Threaded internal bore 46 of fitting 34 allows pressure gauge 42 to fluidly communicate with the interior of fire extinguisher 20 so that pressure gauge 42 is operable to measure and display the internal pressure of fire extinguisher 20.

Fitting 36 is illustrated in FIGS. 6, 9, and 10 and includes annular grooves 48 similar to annular grooves 40 of fitting 34. As illustrated in FIG. 6, material of tube wall 32 flows into and occupies annular grooves 48 of fitting 36 in the final construct of fire extinguisher 20, as discussed above. As illustrated in FIGS. 6 and 10, fitting 36 includes internal aperture 50 having threaded sections 52, 54. Referring to FIGS. 6, 9, and 10, threaded section 52 of internal aperture 50 is sized to accommodate valve 56 threadedly engaged therein. Valve 56 includes O-ring 58 positioned about the exterior thereof. O-ring 58 facilitates sealing between the exterior of valve 56 and internal aperture 50 of fitting 36. Valve 56 includes valve stem 60 having valve cover 62 connected to one end thereof.

Valve cover 62 includes O-ring 64 operably positioned about the periphery thereof to facilitate sealing of valve cover 62 with valve seat 66.

FIG. 9 is an exploded view showing valve 56 prior to being secured within threaded section 52 of internal aperture 50. Valve 56 is illustrated in its closed position in FIG. 9. Flange 68 is connected to the end of valve stem 60 opposite valve cover 62. As illustrated in FIG. 9, valve 56 includes support 70. Spring 72 is positioned about valve stem 60 intermediate flange 68 and support 70 and acts to bias valve 56 into its closed position, as illustrated in FIG. 9. Valve 56 includes a generally cylindrical body terminating at one end in valve seat 66, shown in FIG. 6, and having an opening at the other end. The end of the cylindrical body of valve 56 opposite valve seat 66 includes support 70 extending therefrom. Actuation of flange 68 towards support 70 against the bias of spring 72 acts to open valve 56 and allow fluid flow through valve 56 and thereafter past valve seat 66.

Figure 11:
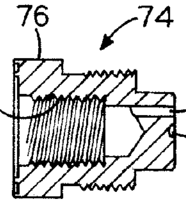
FIG. 11 is a sectional view of a pressure switch connector used to connect a pressure switch to a fitting closing an end of a fire extinguisher of FIG. 1.

Referring still to FIGS. 6 and 9, pressure switch connector 74 is threadedly engaged in threaded section 54 of internal aperture 50 of fitting 36. Pressure switch connector 74 includes flange 76 which, in construction, abuts shoulder 78 of fitting 36 to facilitate making a seal therebetween. As illustrated in FIGS. 9 and 11, connector 74 includes central detent 80. Central detent 80 has an internal diameter slightly greater than the external diameter of flange 68 of valve 56, so that with pressure switch connecter 74 threadedly engaged with fitting 36, as illustrated in FIG. 6, flange 68 is positioned within central detent 80 of connector 74.

As illustrated in FIG. 6, connector 74 includes internal threaded bore 82 in fluid communication with fluid passage 84. As illustrated in FIG. 6, with connector 74 threadedly engaged with fitting 36, flange 68 of valve 56 is positioned within central detent 80 of connector 74 and connector 74 forces flange 68 to move against the biasing force of spring 72 toward support 70 to unseat valve cover 62 from valve seat 66. In this position, fluid contained within tube 22 can flow through valve 56 and fluid passage 84. Referring to FIGS. 6 and 9, pressure switch 86 is threadedly engaged in internal threaded bore 82 of connector 74. With the construct shown in FIG. 6, pressure switch 86 is in fluid communication with the contents of tube 22 through fluid passage 84 and valve 56, and is operable to provide a signal to a computational device indicative of whether the pressure in tube 22 drops below a predetermined value. For example, in a vehicle the pressure switch may signal a computational device that activates a visual indication device, such as a light bulb, mounted in the dashboard of the vehicle to provide a visual signal to the driver that the pressure in tube 22 is low. In certain embodiments, pressure gauge 42 and pressure switch 86 may not be desired. In these embodiments, fittings 34, 36 will have plugs operably associated therewith to prevent fluid flow from passing through the internal bores of fittings 34, 36. Alternatively, in embodiments in which pressure gauge 42 and pressure switch 86 are not desired, fittings 34, 36 may be formed as solid plugs, i.e., without internal bores 46, 50, respectively.

In use, fire extinguisher 20 is positioned such that discharge window 30 opens toward a particular area at potential risk for fire. For example, certain military vehicles are sometimes susceptible to having small combustible devices, such as "Molotov cocktails," detonated within their wheel wells in an attempt to render the vehicle inoperable. In these circumstances, fire extinguisher 20 can be positioned with discharge window 30 pointed downwardly away from the vehicle's wheel well and toward the vehicle's tire. With this configuration, if a combustible device is exploded within the wheel well of the vehicle, the sudden rise in temperature will cause tube 22 to soften and rupture against the force of its expanding, pressurized contents, thereby dispensing fire inhibiting substance 28 within the wheel well and extinguishing the fire.

Method and Apparatus for Forming Discharge Window 30 in Tube 22

Figure 12:
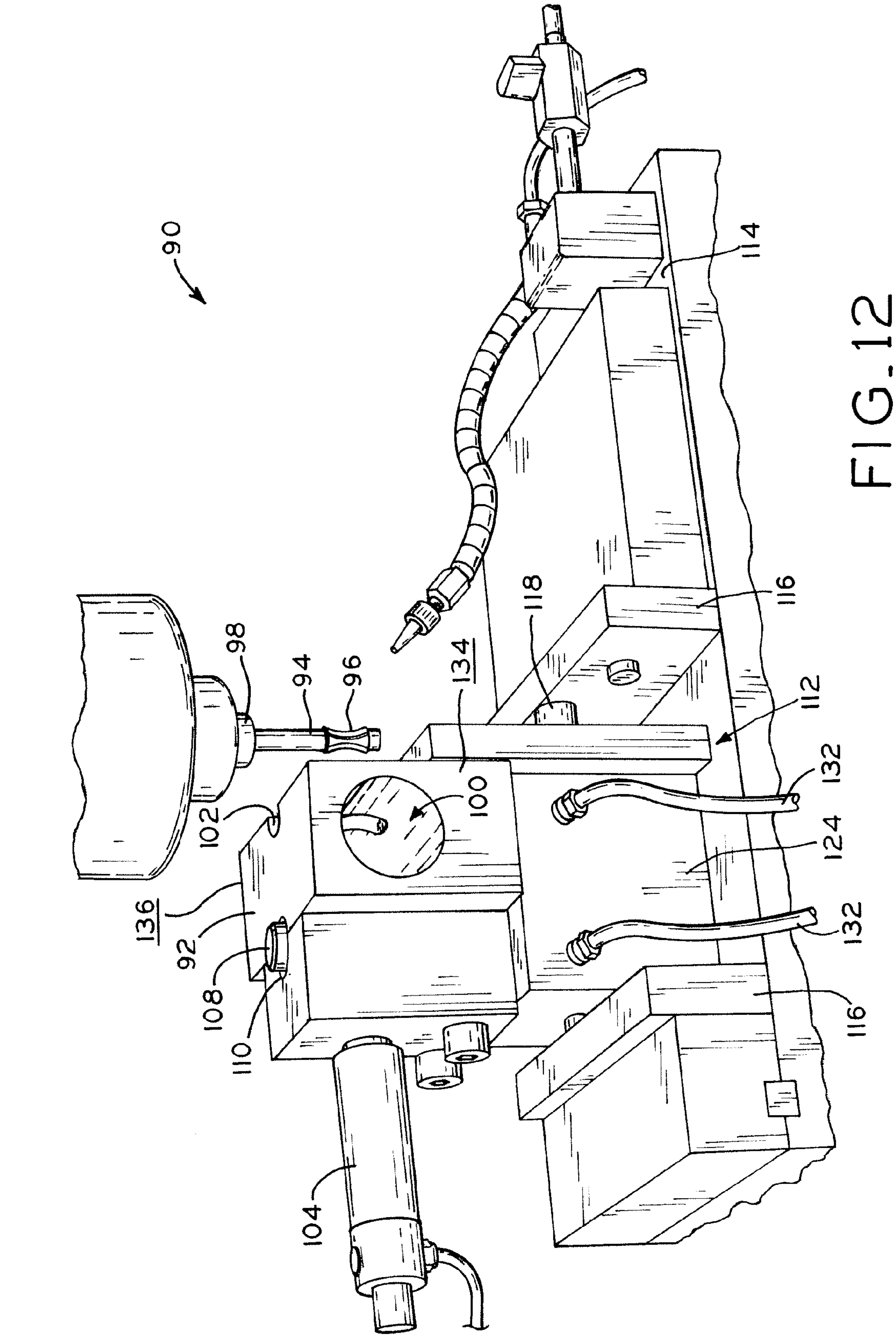
FIG. 12 is a perspective view of a shaping device for milling a tube which forms a part of the fire extinguisher in FIG. 1.

Referring to FIG. 12, shaping device 90 is utilized to form discharge window 30 in tube 22. Specifically, shaping device 90 is utilized to mill discharge window 30 in tubular stock material utilized to create tube 22 of fire extinguisher 20. In one exemplary embodiment, raw tubing used to form tube 22 has a wall thickness of 0.065 inches and shaping device 90 is utilized to mill off 0.010 inches of wall material to create discharge window 30, shown in FIG. 1. Discharge window 30 defines an outer perimeter and covers a substantial area of the outer surface of tube 22, which can constitute as little as 5%, 10% or 15% of the surface area of the outer surface of tube 22 excluding ends 24, 26 and as much as 40%, 45%, or 50% of the surface area of the outer surface of tube 22 excluding ends 24, 26. In one embodiment, tube 22 measures 8 inches long and 1½ inches in diameter and includes a discharge window constituting 11.6 percent of total surface area of the outside of the tube. In another embodiment, tube 22 measuring 27 inches long and 1½ inches in diameter is formed to include a discharge window constituting 16.8 percent of the total surface area of the outside of the tube. Shaping device 90 includes tube guide 92 and tool 94. Tool 94 includes radiused cutting surface 96 having a radius of curvature substantially matching the radius of the raw tube material used to form tube 22 of fire extinguisher 20, shown in FIG. 1.

Figure 13:
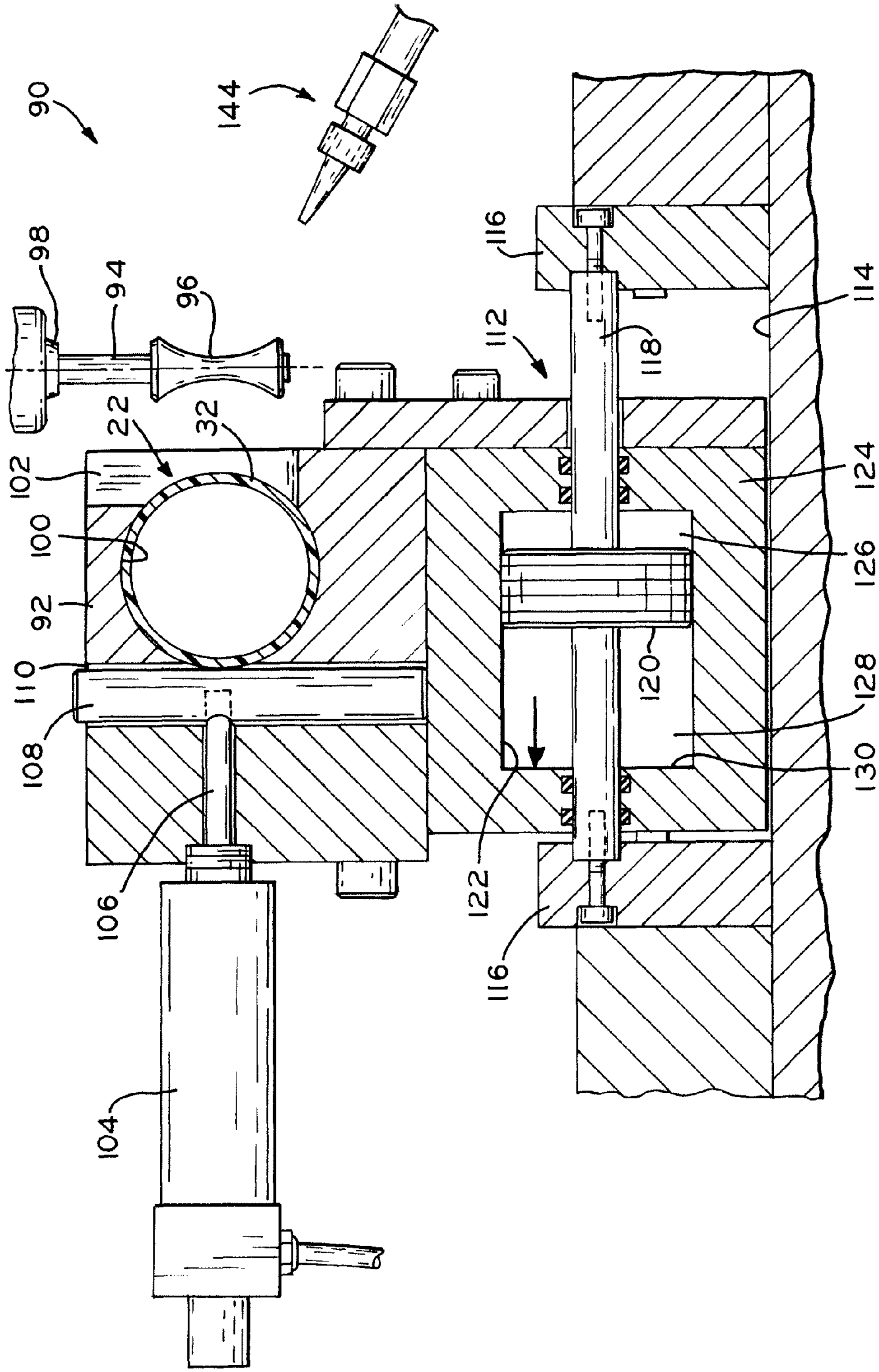
FIG. 13 is a sectional view of an actuation device and tube guide forming a part of the shaping device illustrated in FIG. 12.
Figure 14:
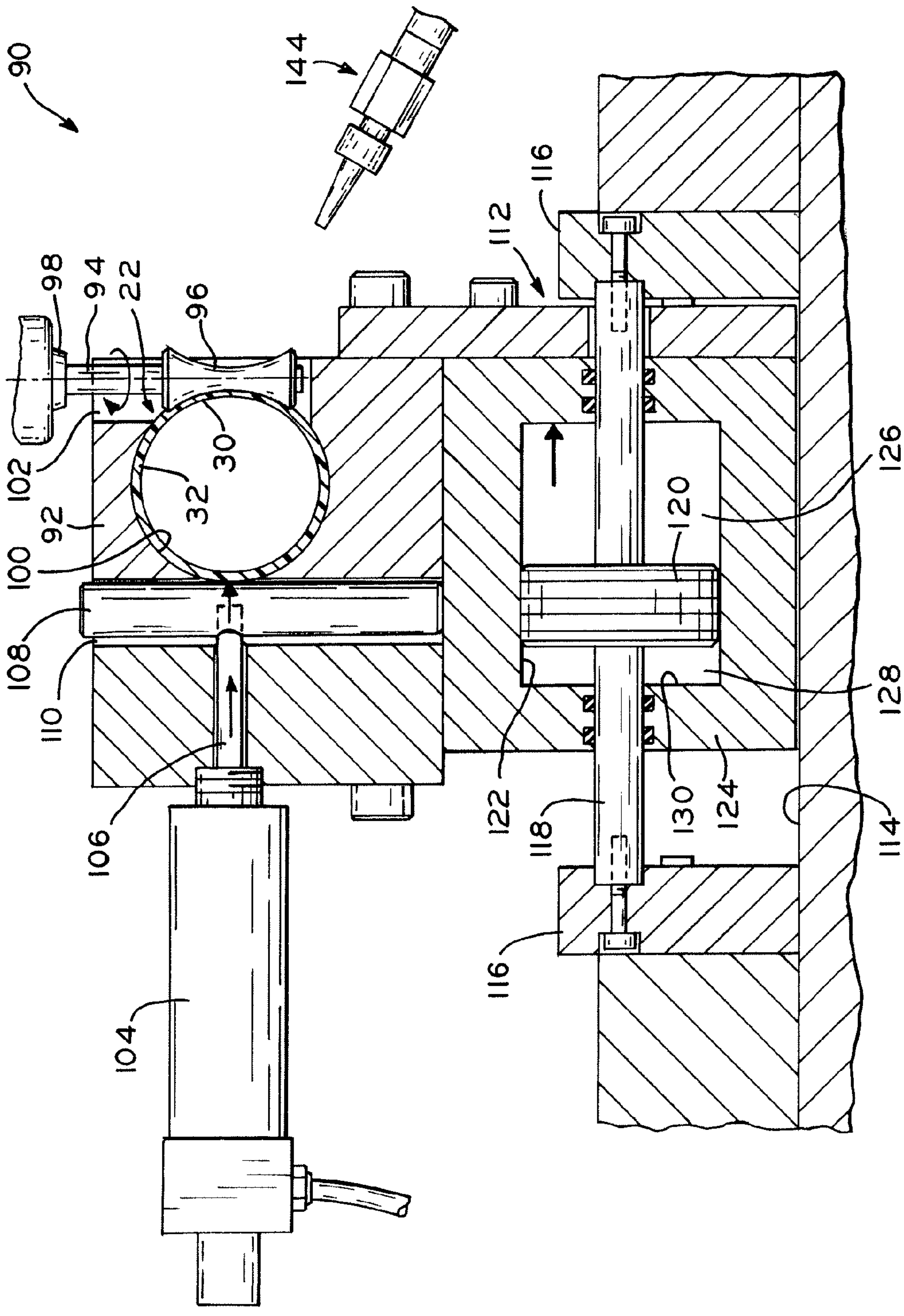
FIG. 14 is a sectional view illustrating a tube guide and actuation device in operable position to allow for milling a tube which forms a part of the fire extinguisher in FIG. 1.

As illustrated in FIGS. 12-14, tool 94 is operatively connected to chuck 98. Chuck 98 is operably connected to a motor utilized to rotate chuck 98 as is well known in the art. Tube guide 92 includes elongate aperture 100 formed throughout its length. Elongate aperture 100 has an inner diameter just slightly larger than the outer diameter of the stock material utilized to form tube 22 of fire extinguisher 20, shown in FIG. 1. As illustrated in FIGS. 12-14, tube guide 92 includes tool cutout 102 formed in a wall thereof. Specifically, tool cutout 102 is formed as a slot in the wall of tube guide 92 facing tool 94. Tool cutout 102 intersects elongate aperture 100 of tube guide 92 to provide an access through which tool 94 contacts tube 22 as shown in FIG. 14.

Referring to FIGS. 13 and 14, shaping device 90 includes pneumatic cylinder 104 including pneumatic piston 106. Pneumatic piston 106 is threadedly engaged with rod 108. In one exemplary embodiment, rod 108 is a brass rod. Rod 108 occupies rod channel 110 in tube guide 92. Rod channel 110 intersects elongate aperture 100 of tube guide 92 so that rod 108 can be positioned in abutting relationship with tube 22 as shown in FIG. 14.

Pneumatic cylinder 104 is utilized to move pneumatic piston 106 and, consequently, rod 108 to facilitate milling of tube 22. FIG. 13 illustrates pneumatic piston 106 in a withdrawn position. Consequently, rod 108 is also in a withdrawn position. In its withdrawn position, rod 108 does not apply a significant normal force to tube 22 and, therefore, does not significantly impede progress of tube 22 through tube guide 92. FIG. 14 illustrates pneumatic piston 106 actuated to position rod 108 in abutting relationship with tube 22. In this position, rod 108 applies a normal force to tube 22 to thereby frictionally resist movement of tube 22 through tube guide 92 and to insure that tube 22 is flush with the portion of the interior wall of tube guide 92 formed by elongate aperture 100 which is closest to tool 94. With tube 22 flush with this interior wall of tube guide 92, tool 94 can be operably positioned against tube 22 to effect milling thereof as illustrated in FIG. 14. In one exemplary embodiment, air source 144 is utilized to provide a stream of air directed to tool 94 during the milling process. It has been found that the provision of a stream of air during milling facilitates creation of discharge window 30 by removing debris, such as shavings, that could interfere with the milling process. Additionally, the use of a stream of air cools tool 94 during the milling process.

The normal force applied by rod 108 to tube 22 is sufficient to position tube 22 in the position illustrated in FIG. 14 for milling, as described above, but also creates a small enough frictional resistance to passage of tube 22 through elongate aperture 100 so that tube 22 may be longitudinally displaced through elongate aperture 100 to effect milling of discharge window 30, shown in FIG. 1. In one exemplary embodiment, rod 108 if formed of brass to prevent scarring of tube 22 as it passes through elongate aperture 100 during the milling process. Other relatively soft materials may be used to form rod 108 to prevent scarring. In one embodiment, tube 22 may be advanced through elongate aperture 100, in contact with rod 108, either by a mechanical controller, not shown, or by the application of force from the operator of shaping device 90.

Shaping device 90 further includes actuation device 112. Actuation device 112 moves relative to the remaining structure of shaping device 90 to position tube 22 into engagement with tool 94 as illustrated in FIG. 14 and out of engagement with tool 94 as illustrated in FIG. 13. In this exemplary embodiment, tube 22 is moved relative to tool 94 which remains stationary. In further embodiments of the present invention, tube 22 could remain stationary, with tool 94 being moved into and out of position to mill tube 22. Further, both tube 22 and tool 94 could be moved to position tube 22 and tool 94 to allow for milling of tube 22 and to move one or both of tube 22 and tool 94 out of position whereby tool 94 cannot effect milling of tube 22.

Referring to FIGS. 12-14, shaping device 90 includes bed 114 with walls 116 extending upwardly therefrom. Upwardly extending walls 116 may be part of a clamping mechanism utilized to clamp items to bed 114 of shaping device 90. Upwardly extending walls 116 may further be formed as stationary walls extending upwardly from bed 114. As illustrated in FIGS. 12-14, actuation device 112 is positioned intermediate upwardly extending walls 116. Referring to FIGS. 13 and 14, rod 118 is secured to each of upwardly extending walls 116. As illustrated in FIGS. 13 and 14, pneumatic piston 120 is fixably secured to rod 118. Pneumatic piston 120 is operably positioned within pneumatic cylinder 122 for reciprocation therein. Pneumatic cylinder 122 is formed in cylinder housing 124. Cylinder housing 124 is positioned above bed 114 with a slight spacing therebetween. The spacing between cylinder housing 124 and bed 114 allows cylinder housing 124 to reciprocate between upwardly extending walls 116 as will be further described hereinbelow. With rod 118 secured to upwardly extending walls 116 and cylinder housing 124 free to move therebetween, actuation of actuation device 112 causes movement of cylinder housing 124 along rod 118.

Pneumatic piston 120 is sealed against pneumatic cylinder 122 in a conventional manner. Pneumatic piston 120 separates pneumatic cylinder 122 into two chambers 126, 128. To actuate actuation device 112 so that tube 22 is brought into operative contact with tool 94 as illustrated in FIG. 14, compressed air is introduced into chamber 126 to cause cylinder housing 124 to achieve the position illustrated in FIG. 14. In certain embodiments, chamber 128 will include a resilient member positioned between pneumatic piston 120 and wall 130 of cylinder housing 124 so that cylinder housing 124 normally maintains the unactuated position illustrated in FIG. 13. In alternative embodiments, airlines 132, shown in FIG. 12, can be fluidly connected one each to chambers 126, 128. In this embodiment, airlines 132 are utilized to introduce compressed air alternatively into one of chambers 126, 128, depending upon whether the operator of shaping device 90 wishes to position tool 94 in operative contact with tube 22. Specifically, introduction of compressed air into chamber 126 will position tool 94 in operative engagement with tube 22 as illustrated in FIG. 14. Similarly, introduction of compressed air into chamber 128 will cause actuation of actuation device 112 into the position illustrated in FIG. 13, in which tool 94 is positioned a distance from tube 22.

In use, shaping device 90 is initially positioned as illustrated in FIGS. 12 and 13, i.e., with tool 94 positioned a distance from tube guide 92. Tube 22 is then positioned within elongate aperture 100 of tube guide 92. Because discharge window 30, shown in FIG. 1, does not run the entire length of tube 22, tube 22 is advanced through elongate aperture 100 until the end of tube 22 passes tool cutout 102 by a predetermined distance. In one embodiment, that predetermined distance is defined by the distance between wall 134 of tube guide 92 and tool cutout 102. In this embodiment, tube 22 is advanced, as described above, until its end is flush with wall 134. With tube 22 in this position, pneumatic cylinder 104 is actuated to bring rod 108 into frictional engagement with tube 22 as described in detail above. Actuation device 112 is then actuated by introducing compressed air into chamber 126, shown in FIG. 14, of pneumatic cylinder 122 until actuation device 112 achieves the position illustrated in FIG. 14, with tool 94 operatively contacting tube 22. With actuation device 112 positioned as illustrated in FIG. 14, tube 22 is advanced through tube guide 92 at a sufficient pace to allow tool 94 to mill discharge window 30 into tube 22, shown in FIG. 1.

As described above and shown in the drawings accompanying this description, discharge window 30 does not run the entire length of tube 22. Therefore, milling is stopped before tube 22 is completely advanced through tube guide 92. In one embodiment, tube 22 is inserted through elongate aperture 100 at surface 136 of guide tool 92. However, tube 22 can also be inserted through elongate aperture 100 beginning at surface 134 of tool guide 92. In one embodiment, the distance between the trailing end of tube 22, the trailing end of tube 22 being determined relative to the tube's advancement through tube guide 92, and the predetermined end of discharge window 30 proximate the trailing end of tube 22, is the same as the distance from tool cutout 102 to trailing wall 136 of tube guide 92. With this in mind, milling is stopped when the trailing end of tube 22 is flush with trailing wall 136 of tube guide 92. With tube 22 advanced until its trailing end is flush with trailing wall 136 of tube guide 92, actuation device 112 is moved into the position illustrated in FIGS. 12 and 13 and tube 22 is removed from tube guide 92. In one embodiment of the present invention, a tube cutter, not shown, may be positioned adjacent trailing wall 136 of tube guide 92 to allow for cutting a continuous feed of tube stock into tubes 22 of desired length.

Sealing of Fire Extinguisher Tube

Figure 15:
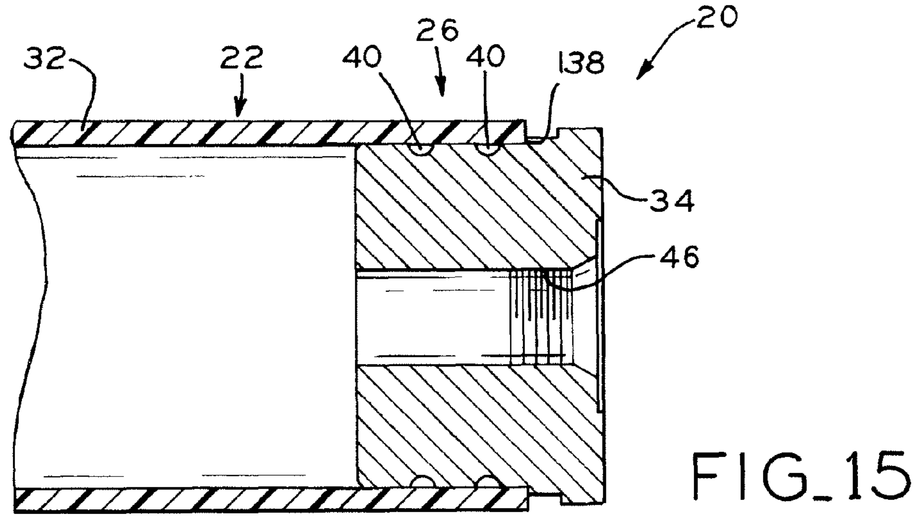
FIGS. 15-17 are fragmentary sectional views illustrating progressive steps in a process of crimping a tube to a fitting to form an enclosure for a fire inhibiting substance.
Figure 16:
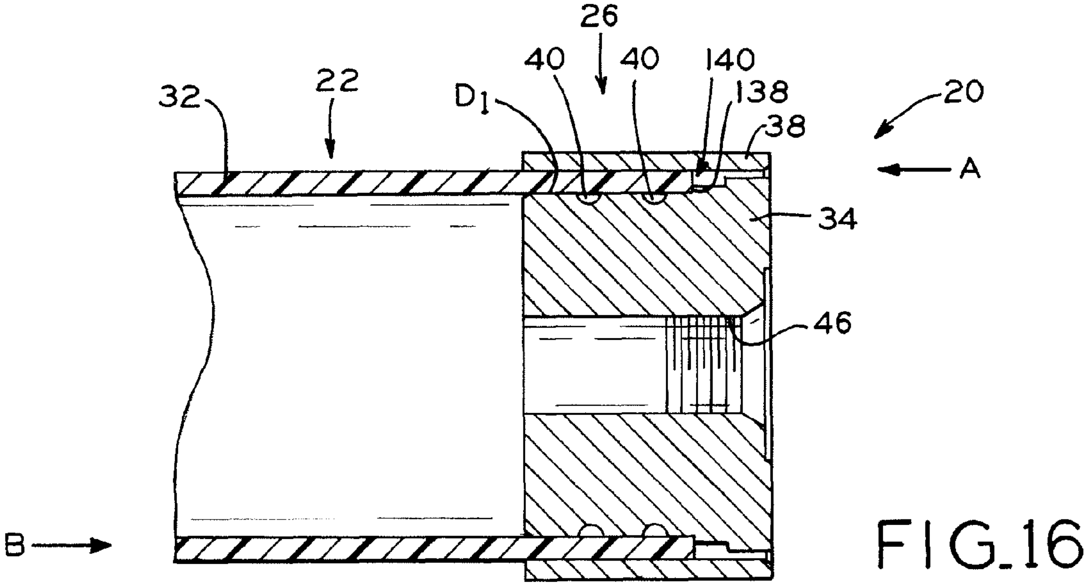
Figure 17:
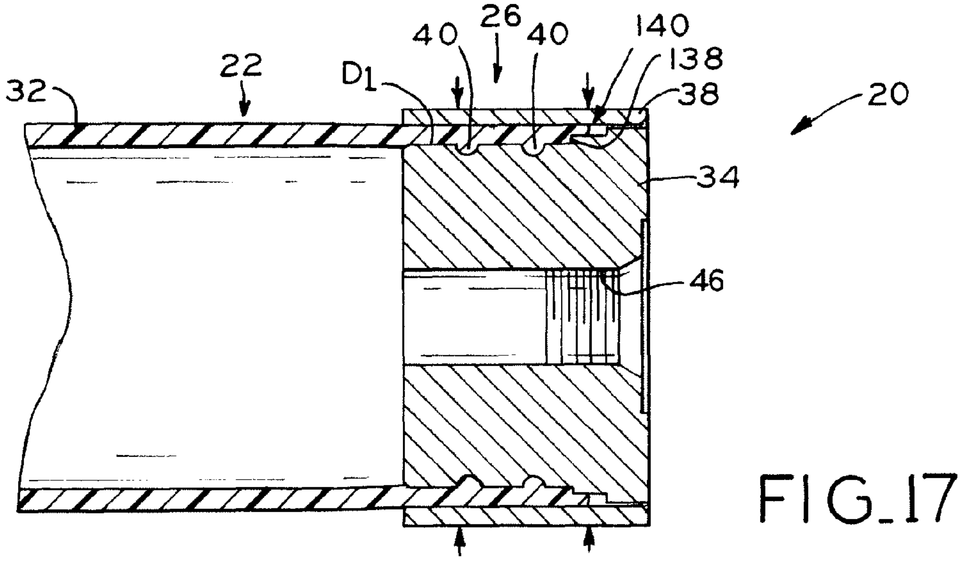

Referring to FIGS. 1 and 6, fire extinguisher 20 includes tube 22 and opposite ends 24, 26. Opposite ends 24, 26 each include a fitting 36, 34, respectively, positioned within tube 22 as well as collars 38 surrounding a portion of tube 22 and fittings 34, 36. The process of forming opposite ends 24, 26 will now be described in detail with specific reference to end 26. Referring to FIGS. 15-17, construction of end 26 begins by heating the end of tube 22 which will be placed over fitting 34 as illustrated in FIGS. 15-17. Specifically, the end of tube 22 is heated until the material forming tube wall 32 is flowable. In one exemplary embodiment, a heated basin is filled with sand and is thereafter raised to a temperature sufficient to heat tube 22 until the material of tube wall 32 is flowable. In the exemplary embodiment described herein, the basin is heated to 250° F. The basin can be heated to temperatures as low as 210° F., 215° F., 220° F., or 225° F. and as high as 260° F., 265° F., 270° F., or 275° F. The necessary heating temperature and time of heating are related and different combinations of time and temperature may be utilized to heat the end of tube 22 until the material forming tube wall 32 is flowable.

After heating the end of tube 22 until the material formed in tube 22 is flowable, the heated tube end is positioned over fitting 34, as illustrated in FIG. 15. As illustrated in FIG. 15, fitting 34 includes a first outer diameter $D_1$ slightly smaller than the inner diameter of tube 22. First outer diameter $D_1$ terminates at shoulder 138. Shoulder 138 forms a stop for tube 22. That is, when end 26 of tube 22 is positioned over fitting 34, progress of tube 22 over fitting 34 is restricted when the end 26 of tube 22 abuts shoulder 138. Collar 38 is thereafter slid over end 26 of tube 22 in the direction of arrow A, shown in FIG. 16, until it is positioned over fitting 34, as illustrated in FIGS. 16 and 17. In another embodiment, collar 38 could be slid over end 26 in the direction of arrow B, shown in FIG. 16. Collar 38 is sized to provide a tight fit over end 26 of tube 22 and apply a radially inward force, as illustrated in FIG. 17. Furthermore, collar 38 includes bevel 39, as illustrated in FIG. 5, to facilitate placement of collar 38 over end 26 of tube 22. The radially inward force supplied by collar 38 causes tube wall 32, which is heated into a flowable condition, to press and flow into annular grooves 40 in fitting 34 and thereby create a robust seal between fitting 34 and tube 22. As collar 38 applies the aforementioned radially inward force, material of tube wall 32 will naturally expand beyond shoulder 138, as illustrated in FIG. 17. To accommodate expansion of tube wall 32 during the positioning of fitting 34 over end 26 of tube 22 described hereinabove, expansion area 140 is formed between fitting 34 and collar 38. Expansion area 140 is sufficiently sized to accommodate expansion of tube wall 32 during the positioning of fitting 34 over end 26 of tube 22.

Referring to FIG. 10, fitting 36 at the other end 24 of tube 22 includes annular grooves 48 similar to annular grooves 40 formed in fitting 34. Further, fitting 36 includes shoulder 142 similar to shoulder 138 of fitting 34. Fitting 36 is sized similar to fitting 34 to allow for positioning of fitting 36 over end 24 of tube 22 in the same way described above with respect to fitting 34 and end 26 of tube 22.

Figure 18:
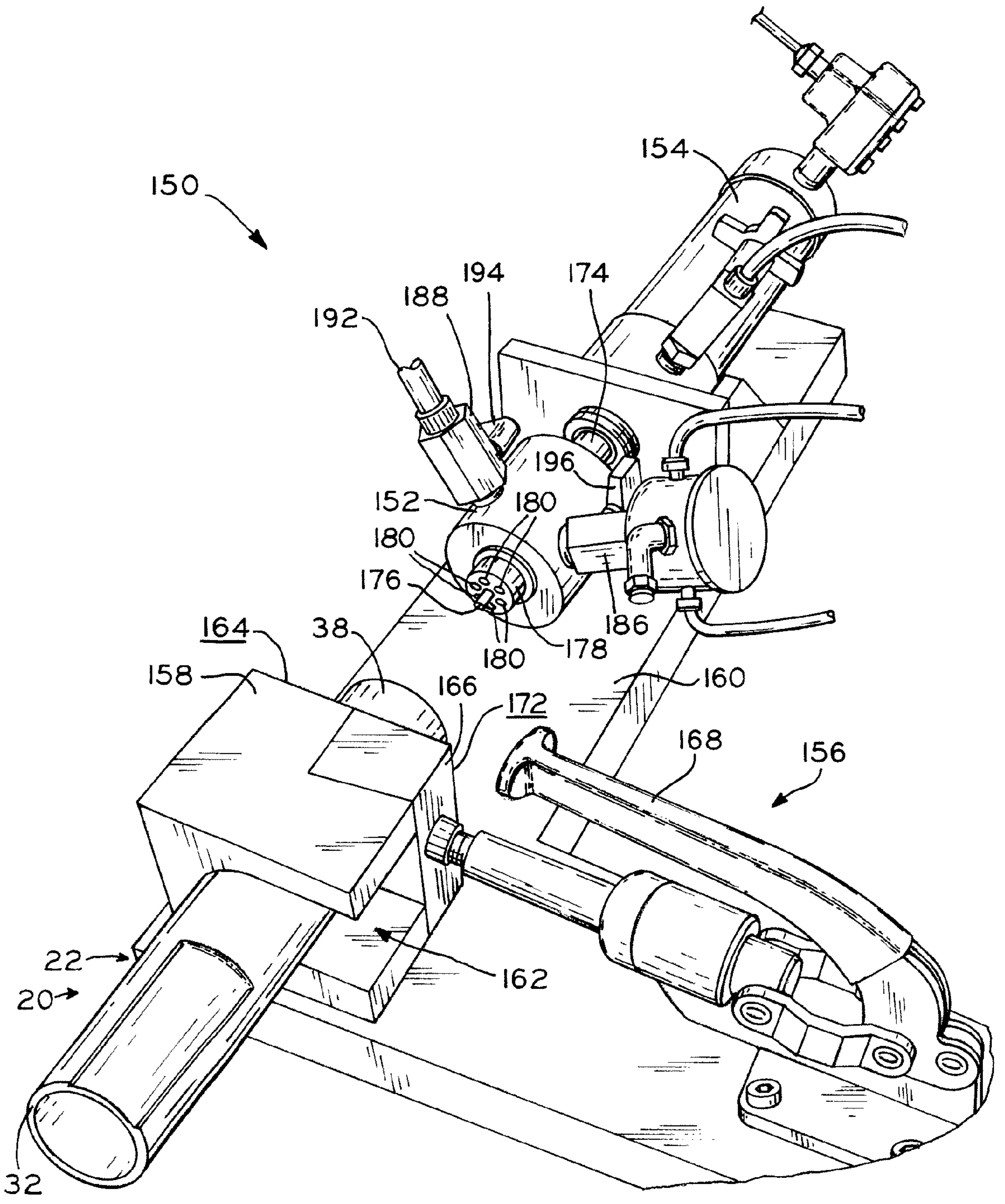
FIGS. 18-20 are perspective views of a tube filling apparatus of the present invention.

Method and Apparatus for Filling the Fire Extinguisher with a Quantity of Fire Inhibiting Substance Referring to FIG. 18, tube filling apparatus 150 is utilized to fill fire extinguisher 20 with fire inhibiting substance 28, shown in FIG. 6. Tube filling apparatus 150 includes valve body 152 connected to pneumatic cylinder 154. Tube filling apparatus 150 further includes clamp 156 for holding fire extinguisher 20 during the process of filling the same with fire inhibiting substance 28. Valve body 152 is connected to a source of fire inhibiting substance 28, as well as a source of pressurized inert gas, and is used to fill fire extinguisher 20 with fire inhibiting substance and pressurize the same with a quantity of inert gas.

Figure 19:
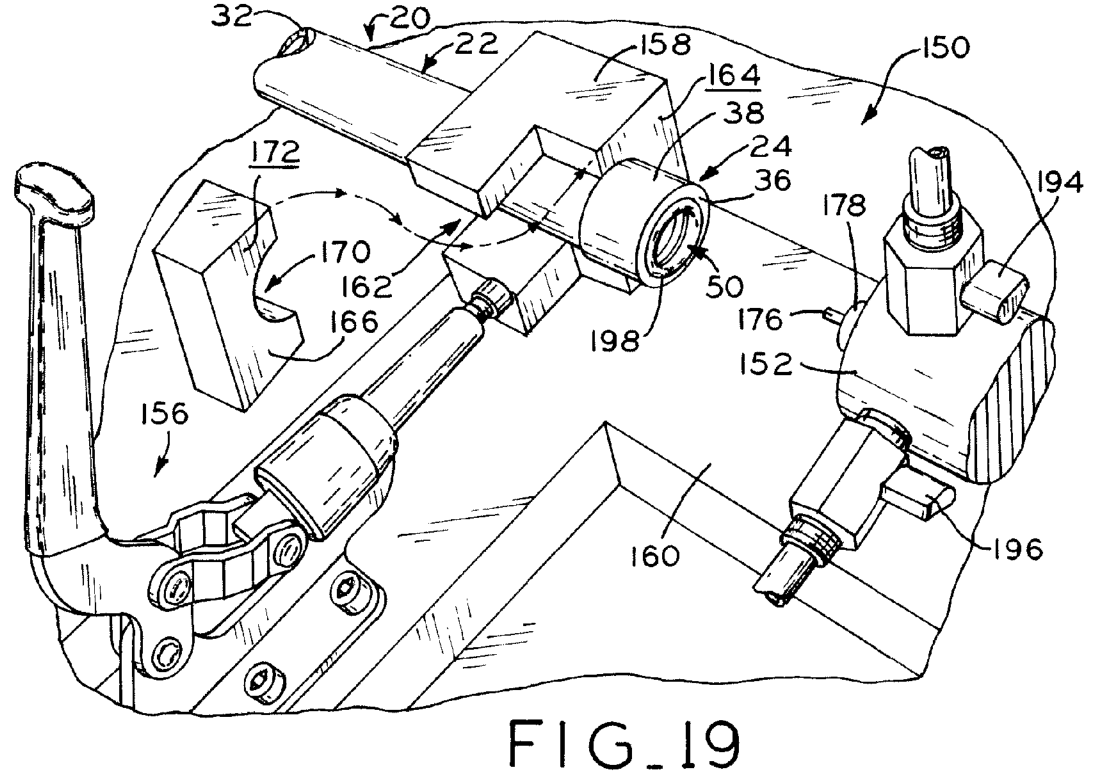
Figure 20:
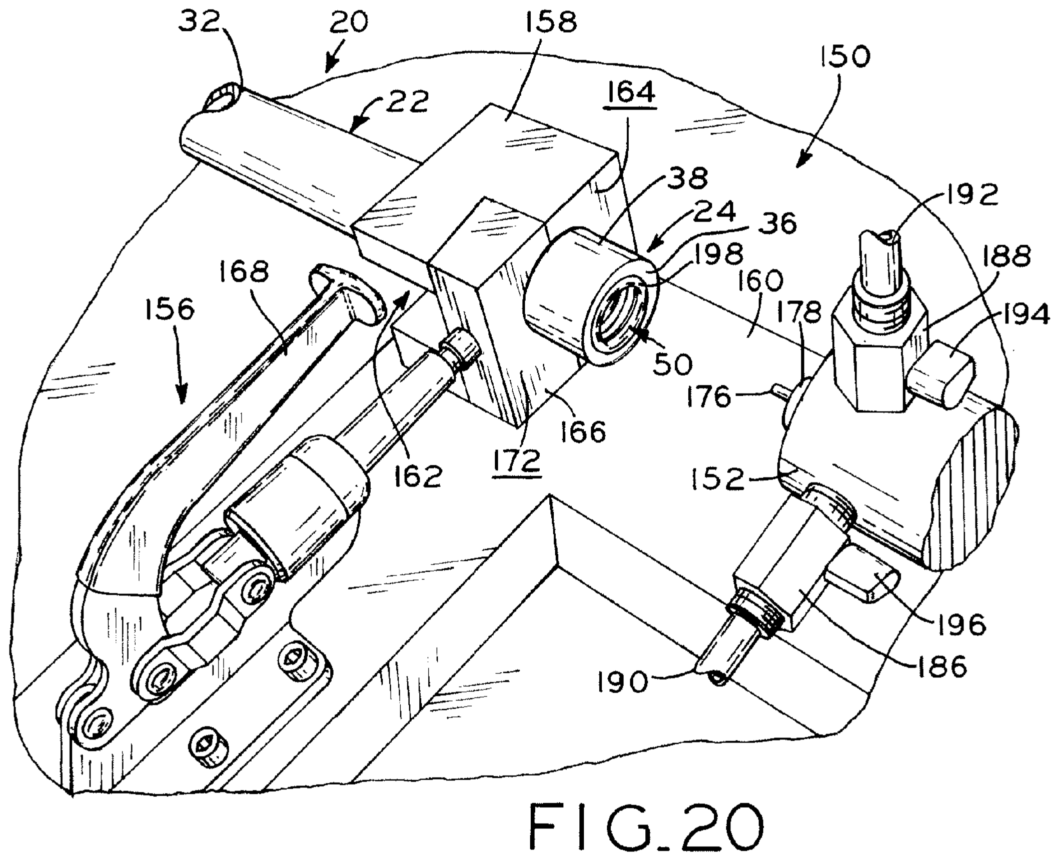

Referring to FIGS. 19 and 20, the process of filling fire extinguisher 20 with fire inhibiting substance 28, shown in FIG. 6, and pressurizing the same with an inert gas begins by positioning fire extinguisher 20 within clamp 156. As illustrated in FIG. 19, clamp 156 includes brace 158 secured to frame 160. As illustrated in FIG. 20, brace 158 includes internal bore 162. Internal bore 162 is slightly larger than the outer diameter of tube 22. To clamp fire extinguisher 20 in place, fire extinguisher 20 is first positioned within internal bore 162 of brace 158 as illustrated in FIG. 19. In this position, collar 38 abuts front face 164 of brace 158. With fire extinguisher 20 positioned as illustrated in FIG. 19, removable brace block 166 is positioned as illustrated in FIG. 20 and clamped against brace 158. To clamp removable brace block 166 against brace 158, lever 168 is actuated from the position shown in FIG. 19 to the position shown in FIG. 20. Actuation of lever 168 in this way pushes clamp rod 171 against removable brace block 166 to clamp removable brace block 166 against brace 158. Removable brace block 166 includes circular cutout 170, shown in FIG. 19. Circular cutout 170 includes a radius of curvature slightly larger than the radius of the exterior of tube 22. With removable brace block 166 clamped against brace 158 as illustrated in FIG. 20, collar 38 abuts front face 164 of brace 158 and front face 172 of removable brace block 166. With fire extinguisher 20 clamped in place as illustrated in FIG. 20, valve body 152 can be moved into position to fill fire extinguisher 20 with fire inhibiting substance 28 and pressurize the same with an inert gas.

Figure 21:
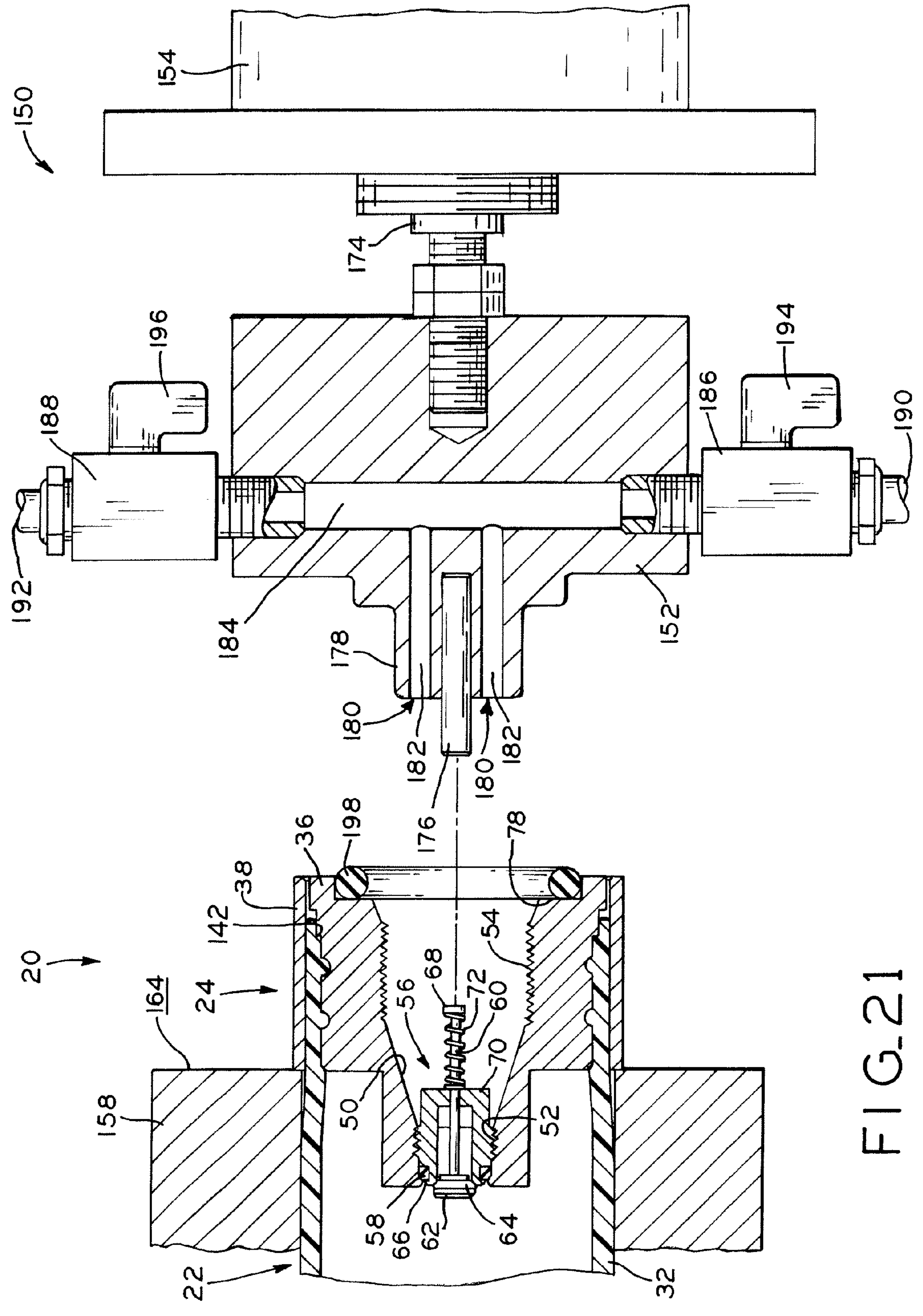
FIGS. 21 and 22 are partial sectional views of a fire extinguisher and valve body used to fill the fire extinguisher with a fire inhibiting substance and pressurize the same.
Figure 22:
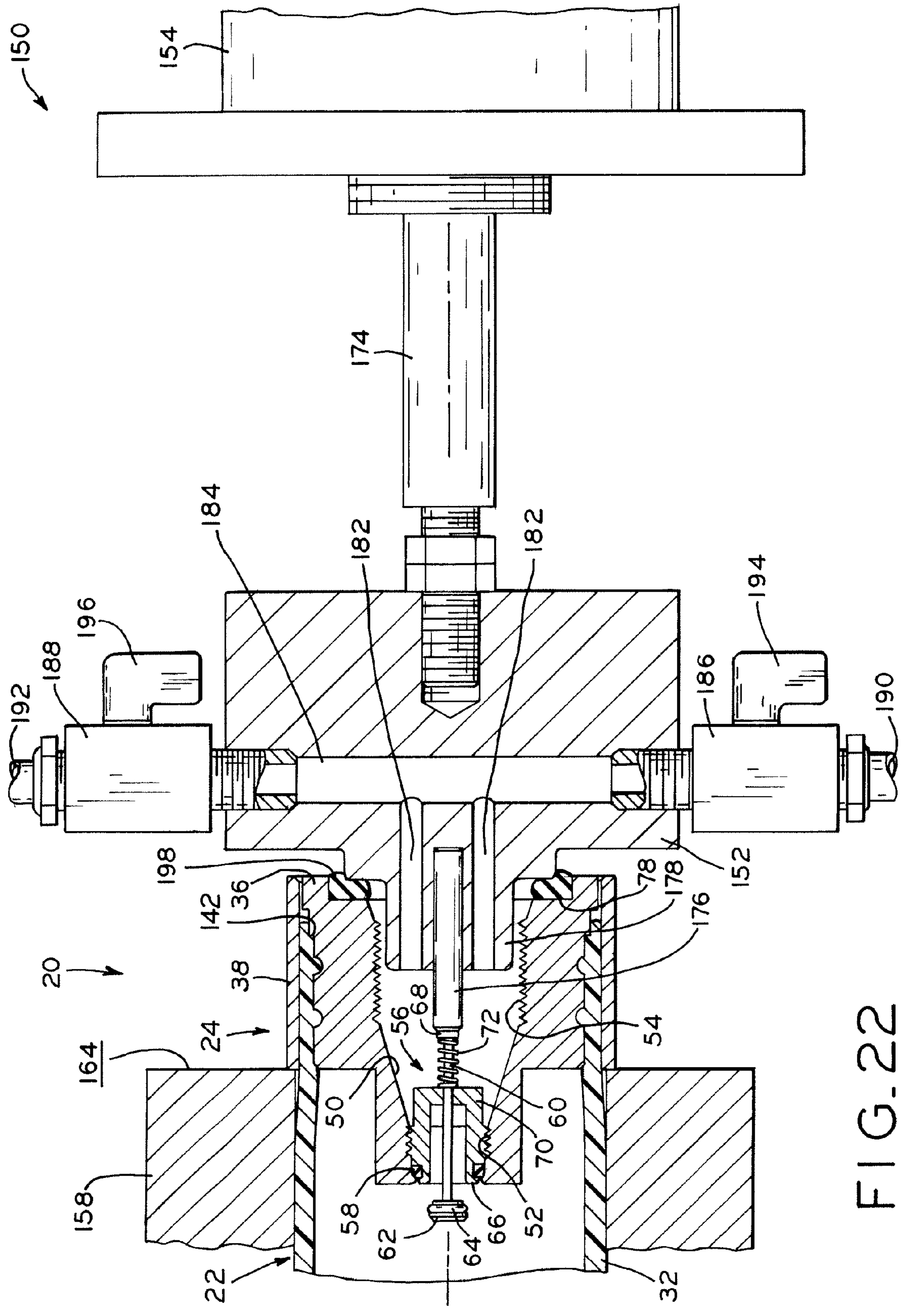

As illustrated in FIGS. 18, 21, and 22, valve body 152 is secured to pneumatic piston 174. Pneumatic piston 174 is operatively connected to pneumatic cylinder 154 and is reciprocal relative thereto. Specifically, pneumatic piston 174 can be moved from a retracted position, as illustrated in FIG. 21, to an extended position, as illustrated in FIG. 22. Valve body 152 is maintained in the retracted position illustrated in FIG. 21 while fire extinguisher 20 is operably positioned within clamp 156 in the manner described above. With fire extinguisher 20 positioned within clamp 156 as illustrated in FIGS. 18 and 20, valve body 152 can be actuated into the extended position illustrated in FIG. 22. As illustrated in FIGS. 21 and 22, pressure switch connector 74, shown in FIG. 6, is not positioned within fitting 36 when fire extinguisher 20 is filled, such that tube filling apparatus 150 has access to valve 56 to effect filling of fire extinguisher 20. As illustrated in FIGS. 18-22, valve body 152 includes actuation plunger 176 extending therefrom. Valve body 152 further includes fill boss 178 extending therefrom. Fill boss 178 includes a plurality of fill apertures 180. As illustrated in FIGS. 21 and 22, fill apertures 180 provide access to fluid passages 182, 184. Fluid passage 184 is operatively connected to a source of fire inhibiting substance 28 as well as a source of inert gas.

Referring to FIGS. 18-22, valve body 152 includes a pair of fittings 186, 188 connected thereto and in fluid communication with fluid passage 184. Fittings 186, 188 include fluid entrances 190, 192, respectively. Fittings 186, 188 further include valves, not shown, operable to place fluid entrances 190, 192 into and out of fluid communication with fluid passage 184. These valves are actuated by levers 194, 196.

To fill fire extinguisher 20, valve body 152 is moved into engagement with fitting 36 by actuating pneumatic piston 174 into its extended position, as illustrated in FIG. 22. In the extended position illustrated in FIG. 22, valve body 152 presses against O-ring 198 to create a seal between valve body 152 and fitting 36. As valve body 152 is moved into this position, actuation plunger 176 contacts flange 68 of valve 56 and moves flange 68 against the biasing force of spring 72 to unseat valve cover 62 from valve seat 66 and place fill apertures 180 in fluid communication with the interior of fire extinguisher 20. With tube filling apparatus 150 positioned as illustrated in FIG. 22, fire extinguisher 20 can be filled with fire inhibiting substance and pressurized with an inert gas.

With valve body 152 sealingly engaged with fitting 36 as illustrated in FIG. 22, lever 194 can be actuated to place the valve contained within fitting 186 in the open position. In this embodiment, fluid entrance 190 is in fluid communication with a source of fire inhibiting substance. With the valve contained within fitting 186 placed in its open position, fire inhibiting substance will flow through fluid entrance 190, fitting 186, fluid passages 184, 182, each of which terminates in an aperture 180, and valve 56 until it fills the interior of fire extinguisher 20. Lever 194 is maintained in the open position until the interior of fire extinguisher 20 is sufficiently filled with fire inhibiting substance. In one exemplary embodiment, fire extinguisher 20 is approximately 95% filled with fire inhibiting substance. Thereafter, lever 194 is actuated to place the valve contained within fitting 186 in its closed position and discontinue filling fire extinguisher 20 with fire inhibiting substance. Thereafter, lever 196 is actuated to place the valve within fitting 188 in its open position to allow a source of pressurized inert gas fluidly connected to fluid entrance 192 to flow through fluid entrance 192, fitting 188, fluid passages 184, 182, each of which terminates in an aperture 180, and valve 56 to fill the space remaining in fire extinguisher 20 with inert gas and place the contents of fire extinguisher 20 under pressure.

In one exemplary embodiment, the contents of fire extinguisher 20 are pressurized to 100 psi. In one exemplary embodiment, pressure gauge 42 is operably positioned on end 26 of tube 22 of fire extinguisher 20 opposite fitting 36, as illustrated in FIG. 6. In such an embodiment, pressure gauge 42 can be utilized to read the pressure within fire extinguisher 20 until sufficient pressure is achieved. When sufficient pressure is achieved, lever 196 can be utilized to close the valve contained within fitting 188 to discontinue adding pressurized inert gas to the interior of fire extinguisher 20. With fire extinguisher 20 fully filled and pressurized, pneumatic piston 174 can be actuated to the retracted position illustrated in FIG. 21. Movement of pneumatic piston 174 from the extended position illustrated in FIG. 22 to the retracted position illustrated in FIG. 21 is effected very quickly. With this in mind, spring 72 quickly biases valve 56 into its closed position before more than a minimal amount of fire inhibiting substance and pressurized gas escapes the interior of fire extinguisher 20.

Pressure switch 86 and pressure switch connector 74 can now be operatively secured to fitting 36 as illustrated in FIG. 6 and further described above. Fire extinguisher 20 is now ready for use.

While the exemplary embodiment described above employs a single, straight tubular enclosure for the fire inhibiting substance, a curved or otherwise nonlinear tubular structure may be utilized. For example, a tube may include a number of bends to facilitate placement in a desired location.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of sealing a container, comprising the steps of:

providing a container having a wall defining an interior cavity, and a fitting having an exterior surface including at least one groove;

positioning the fitting within an open end of the container at least partially within the interior cavity;

providing a collar sized to provide a tight fit over the end of the container;

heating the wall of the container until the material forming the tube wall is flowable and thereafter deforming the wall by sliding the collar over the end of the container to press at least a portion of the wall into the groove; and filling the interior cavity with a quantity of fire inhibiting substance.

2. The method of claim 1, wherein the wall is tubular.

3. The method of claim 1, wherein said deforming step further comprises deforming at least a portion of the wall into an expansion area of the fitting.

4. The method of claim 1, wherein the container includes a discharge window formed as a substantial area of the wall, the discharge window having a reduced thickness relative to a remainder of the wall.

5. The method of claim 4, wherein the discharge window includes an outer perimeter having a rectangular shape.

6. The method of claim 1, wherein the container is tubular.

7. The method of claim 1, wherein the container comprises a tube having a diameter.

8. The method of claim 1, further comprising providing a second fitting having an exterior surface including at least one groove;

positioning the second fitting within a second open end of the container;

deforming the wall to press at least a portion of the wall into the groove in the second fitting.

9. The method of claim 8, wherein said step of deforming the wall to press at least a portion of the wall into the groove in the fitting further comprises axially deforming a portion of the wall into an expansion area of the fitting, and said step of deforming the wall to press at least a portion of the wall into the groove in the second fitting further comprises axially deforming a portion of the wall into an expansion area of the second fitting.

10. The method of claim 8, wherein said filling step occurs after said deforming steps.

11. The method of claim 8, further comprising the step of heating the wall before the step of positioning the second fitting within the second open end of the container.

12. The method of claim 1, further comprising the step of shaping a discharge window in the wall, said discharge window having a second thickness which is less than said first thickness, said step of shaping a discharge window in the wall comprises:

milling the wall to remove a portion of wall material to form the discharge window.

* * * * *